United States Patent Office 3,357,939
Patented Dec. 12, 1967

3,357,939
POLYURETHANES CONTAINING URETDI-
ONE GROUPS MODIFIED WITH VINYL
POLYMERS
Artur Reischl and Erwin Müller, Leverkusen, and Wilhelm
Göbel, Cologne-Flittard, Germany, assignors to Farbenfabriken Bayer Aktiengesellschaft, Leverkusen, Germany, a corporation of Germany
No Drawing. Filed Sept. 29, 1966, Ser. No. 583,085
Claims priority, application Germany, Nov. 10, 1961,
F 35,330
6 Claims. (Cl. 260—30.6)

ABSTRACT OF THE DISCLOSURE

The composition consists of a preformed vinyl polymer and a polyurethane containing from 2 to 75 weight percent of uretdione groups. The weight ratio of vinyl polymer to polyurethane is 100:1 to 100:200. The vinyl polymers used are: polyvinyl chloride, polyvinyl acetate, polyvinylidene chloride and polystyrene.

---

This invention relates to novel shaped plastic compositions having improved physical properties and more particularly to novel copolymers and a method for making the same. This application is a continuation-in-part of application Ser. No. 235,116, filed Nov. 2, 1962, now abandoned.

It has been heretofore known that some polyurethane compositions may be used to modify certain vinyl polymers. These resulting vinyl plastics especially when foamed have been found to be extremely brittle and will crush readily upon the application of pressure thereto. Further, some of these materials have been found to have a relatively low notch impact resistance and will collapse or crush upon impact with a pressure means. It was further found that many polyurethane compositions because of their high degree of cross linking are not miscible with vinyl polymers, and therefore, are not suitable for use as modifying agents with these vinyl polymers. When many polyurethane compositions which are stable in storage have been tried as modifying agents for vinyl polymers, it was found that these polyurethanes do not cause any modification in the vinyl polymer. It is, of course, desirable when using any chemical composition that it retain its properties and concentration until the time it is used. The use of a modifying agent which will decompose readily upon being stored for any period of time is to be avoided.

It is also known to prepare a polyvinyl foam by adding to a polyvinyl plastisol a polyester and a polyisocyanate which in the presence of water form a polyurethane under carbon dioxide evolution which expands the polyvinyl composition. This procedure is different from the before-mentioned ones and different from the present invention which make use of a prefabricated polyvinyl compound and of a prefabricated polyurethane compound which can be mixed together by conventional means in a broad spectrum of ranges according to the particular requirement of properties of the moldings. In contrast thereto, the above foaming procedure producing the polyurethane in situ affords quite distinct amounts of ingredients to produce a useful material.

It is, therefore, an object of this invention to provide a novel plastic composition having improved physical properties. Another object of this invention is to provide a novel process for making vinyl plastics which have improved physical properties. Still another object of this invention is to provide novel plastic substances comprising a base of vinyl polymers using a stable polyurethane composition. Another object of this invention is to provide a process for the production of novel plastics modified by stable polyurethane compositions.

The foregoing objects and others which will become apparent from the following description are accomplished in accordance with this invention, generally speaking, by providing a novel plastic state which comprises homogeneously mixing a vinyl polymer with a polyurethane composition containing uretdione groups and molding the resulting mixture at elevated temperatures. The process encompassed within this invention provides a method for the production of shaped plastic elements including foamed materials having a base of vinyl polymer in which the vinyl polymer is homogeneously mixed preferably on a roller at temperatures from room temperature up to 200° in a ratio of about 100:1 to about 100:200 with a polyurethane composition which is stable in storage and contains uretdione groups. The mixture of the plastic and the polyurethane composition containing the uretdione groups is shaped at a relatively high temperature, e.g., from 100–200°.

It has been found that the storage-stable polyurethane compositions which contain uretdione groups will enter into reaction in the vinyl plastic at relatively high tempertures. The consequence of this is that the phyical properties of the vinyl polymers are considerably improved. The incombustible shaped plastic elements, according to the present invention, show over heretofore known vinyl compositions an improved resistance to abrasion. Also an improvement of 5–20 times in the notch impact toughness is noted together with comparable ball pressure hardness to the prior art substances. On account of the excellent miscibility, the ratio between the components can be substantially controlled and varied as desired. According to this invention, a ratio between vinyl polymer and polyurethane composition of about 100:1 to about 100:200 is used. A mixing ratio to be emphasized as being particularly advantageous uses 5–30% by weight of storable polyurethane composition comprising uretdione groups. This mixing ratio has been found to be especially easily processable, and it gives with reasonable amounts of the expensive polyurethane a remarkable improvement in the properties of the vinyl polymer.

Vinyl polymers and copolymers included within this invention are polyvinyl chloride, polyvinyl acetate, polyvinylidene chloride, polystyrene and mixtures thereof. These polymers and their monomers may also be mixed with one another. Any of these mixtures, polymers or copolymers may contain plasticizers if desired. Many variations with varied properties can be obtained by selected combinations. The preparation of these polymers are well known in the art; however, methods for the production of these materials which may be used to prepare vinyl polymers in the present invention are given in "Polymers and Resins" by Golding, 1959 edition, published by D. Van Nostrand Co., Inc., pages 409–449 and 506–530.

Storable polyurethane compositions comprising uretdione groups are known per se. They can be prepared by reacting an organic compound containing active hydrogen atoms (as determined by the Zerewitinoff test) which are reactive with —NCO groups with an organic polyisocyanate. Suitable organic compounds containing active hydrogen atoms as above defined are hydroxy polyesters, polyester amides, polyhydric polyalkylene ethers, polyhydric polythioethers, polyacetals and the like. Any suitable hydroxyl polyester may be used such as, for example, the reaction product of a polycarboxylic acid and a polyhydric alcohol. Any suitable polycarboxylio acid may be used in the preparation of the polyesters such as, for example, adipic acid, succinic acid, suberic acid, sebacic acid, oxalic acid, methyl adipic acid, glutaric acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid and the like. Of course, the corresponding acid anhydrides may also be used. Any suitable polyhydric alcohol may be used in the preparation of the polyesters such as, for example, ethylene glycol, propylene glycol, butylene glycol, hexanediol, bis-(hydroxy-methyl cyclohexane), 1,4-butanediol, diethylene glycol, polyethylene glycol, 2,2-dimethyl propylene glycol, xylylene glycol, trimethylol ethane, trimethylol propane, glycerine, pentaerythritol, sorbitol and the like. It is generally preferred that the polyurethane elastomeric plastics have a substantially linear configuration and, therefore, the difunctional acids and alcohols are preferred.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology;" volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxy butyl sulphide, 1,4-(b-hydroxy ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine and the like may be used. Any suitable amino alcohol such as, for example, b-hydroxy ethyl amine and the like may be used. Any suitable polycarboxylic acid may be used such as, for example, those more particularly described above for the preparation of the hydroxyl polyesters. Further, a mixture of a glycol and an amino alcohol or polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butylaldehyde and the like. Any of the polyhydric alcohols mentioned above in the preparation of the hydroxyl polyesters may be used. Any of the polyacetals set forth in U.S. Patent 2,961,428 may be used.

The polyurethane composition can also be obtained with concurrent use of other diisocyanates and also with concurrent use of chain extenders. The content of residues of uretdione isocyanates in the polyurethane composition is preferably 2–75%, and still more preferably 3–20% by weight of the polyurethane composition. Such a content of uretdione isocyanate is sufficient to bring about crosslinking to remarkably improve the properties of the vinyl polymer.

The preparation of relatively stable polyurethane compositions comprising uretdione groups are known in the prior art. Typical of polyurethanes comprising uretdione groups that may be used in the process of this invention are disclosed in German Patent 1,014,740, Canadian Patent 583,363 (issued Sept. 15, 1959) and U.S. application 171,285 filed Feb. 5, 1962, now abandoned. Dimeric diisocyanates are obtained in known manner by a polymerization of monomeric diisocyanates in the presence of catalysts such as, pyridine, trialkyl amines and trialkylphosphines. Typical dimers are the dimeric 2,4-toluylene diisocyanate, 1-chloro-2,4-phenylene diisocyanate, 1-ethyl-2,4-phenylene diisocyanate and 1-ethoxy-2,4-phenylene diisocyanate. The polyurethane comprising uretdione group is made in such a manner and under such conditions that the uretdione group remains intact in the resulting polyurethane. In other words, the dimeric diisocyanate and the polyester, polyether, polythioether, polyacetal or the like, if desired together with a chain-extending agent are reacted at such a low temperature, preferably between 60 and 95° C., to avoid splitting of the uretdione ring to an appreciable extent.

Suitable diisocyanates that may be concurrently used to produce the polyurethanes having uretdione groups are ethylene diisocyanate, ethylidene diisocyanate, propylene diisocyanate, butylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenyl methane diisocyanate, 2,2'-diphenyl propane -4,4'-diisocyanate, 3,3'-dimethyl diphenyl methane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulphone-4,4'-diisocyanate, dichlorohexamethylene diisocyanate, tetramethylene diisocyanate, pentamethylene diisocyanate, hexamethylene diisocyanate, 1-chlorobenzene-2,4-diisocyanate, furfurylidene diisocyanate, 2,7-diisocyanato-dibenzofuran, 1,3,5-benzene triisocyanate, 2,4,6-tolylene triisocyanate, triphenyl methane triisocyanate, tetraphenyl methane tetraisocyanate and the like.

The components are mixed in the required proportions. The processing is for example, carried out by the vinyl polymer and the polyurethane composition being homogeneously mixed on a roller at room temperature or higher temperature, possibly together with fillers such as carbon black or silicic acid aerogel or pigments such as titanium dioxide. Fillers and pigments may also have been previously incorporated by rolling into the vinyl polymer or into the polyurethane composition.

It is possible for plasticizers also to be additionally incorporated with this homogeneous mixing. Suitable plasticizers are, for example, phthalate and phosphate plasticizers, alkyl-sulphonic acid esters of phenol/cresol, polyesters containing free hydroxyl groups, polymer plasticizers based on butadiene-acrylonitrile, copolymers, etc.

The fabrication, i.e., shaping of the mixture at high temperatures is carried out immediately or at a later stage by the methods usual for thermoplastic materials, such as, pressing, extruding, calendering or by the injection molding process. It is also possible by blowing agents being incorporated by means of rolling to produce foam materials in this way which have properties improved with respect to foam materials from the simple vinyl polymers.

The following examples will further illustrate the particulars of this invention. It should be understood, however, that these examples are given for illustration purposes only and are not meant to limit the invention to the particulars defined herein.

*Example 1*

A typical production of the polyurethane composition containing uretdione groups is as follows:

About 1000 parts by weight of an anhydrous polyester (A and B below defined) are stirred with dimeric toluylene 2,4-diisocyanate (identified in below table as I) at a temperature of about 60–95° C. until dissolved and the resulting mix is reacted with 4,4'-diphenyl methane diisocyanate (identified in below table as II) at a temperature of about 90° C., butane 1,4-diol is then allowed to act on the resulting mixture at the same temperature. The resulting composition is a clear melt which is then poured into a container and further heated for about 1 to 10 hours at 90° C.

The polyurethane composition designated as numbers 3 and 4 in the below table do not contain any uretdione groups and are used for comparative purposes in Examples 2, 3 and 4. These polyurethane compositions having no uretdione groups are prepared under the same reaction conditions as given above in this example.

| Polyurethane | Parts by weight of polyester | Parts or diisocyanate | | Parts of butane 1,4-diol |
|---|---|---|---|---|
| | | I | II | |
| 1 | 1,000 A | 90 | 130 | 30 |
| 2 | 1,000 B | 90 | 130 | 30 |
| 3 | 1,000 A | | 220 | 31 |
| 4 | 1,000 A | | 210 | 30 |

A = ethylene glycol-adipic acid polyester (OH number 56; acid number 1).
B = monoethoxylated hexane-1, 6-diol-adipic acid polyester (OH number 56; acid number 1).
The figures represent parts by weight.

The following are used for comparison purposes:

(b) Polyurethane 3 (as made in Example 1)
(c) Butadiene-acrylonitrile copolymer with 38% acrylonitrile.

*Example 4*

About 80 parts by weight of a polyvinyl chloride (K value 70) prepared by emulsion polymerization are processed with 20 parts by weight of one of the substances listed below as in Example 2 and then tested.

There is added to this polyvinyl chloride: (a) uretdione polyurethane 1 (as made in Example 1).

The following are used for comparison purposes:

(b) Polyurethane 3 (as made in Example 1)
(c) Butadiene-acrylonitrile copolymer with 38% acrylonitrile.

The following table indicates the results obtained when additives of Examples 2, 3 and 4 above were mixed with the polyvinyl chloride made.

| Example | DIN 53504 Tensile strength, kg./cm.$^2$ | Breaking elongation, percent | DIN 53453 Impact toughness, kg.-cm./cm.$^2$ | Notch impact toughness | DIN 53456 Ball pressure hardness | |
|---|---|---|---|---|---|---|
| | | | | | 60'' | 10'' |
| 2a | 530 | 50 | Not broken | 11.0 | 1,030 | 1,000 |
| 2b | 561 | 12 | do | 3.9 | 1,140 | 1,080 |
| 2c | 624 | 40 | do | 2.9 | 1,210 | 1,140 |
| 2d | 650 | 55 | do | 3.1 | 1,130 | 1,060 |
| 3a | 510 | 64 | do | 16.0 | 880 | 820 |
| 3b | 519 | 20 | do | 3.0 | 990 | 940 |
| 3c | 623 | 26 | do | 1.8 | 1,180 | 1,110 |
| 4a | 390 | 54 | do | 68.0 | 1,125 | 1,020 |
| 4b | 319 | 44 | do | 11.0 | 690 | 610 |
| 4c | 525 | 34 | do | 2.5 | 1,090 | 1,010 |

*Example 2*

About 95 parts by weight of a polyvinyl chloride (K value 70) prepared by emulsion polymerization have added thereto 1% based on polyvinyl chloride of an organo-tin stabilizer and mixed for about 10 minutes with about 5 parts of the substances referred to below on a mixing roll stand which is at a temperature of about 160° C. Test plates are pressed from the slat at 160° C. for five minutes and test elements are cut out of these plates and tested for tensile strength and breaking elongation according to DIN 53504, impact toughness and notch impact toughness according to DIN 53453 and ball pressure hardness according to draft DIN 53456 (see table).

The following was added to the above prepared polyvinyl chloride: (a) uretdione polyurethane 1 (as made and indicated in the table of Example 1).

For comparison purposes, the following were used:

(b) Polyurethane 4 (as prepared in Example 1)
(c) Butadiene-acrylonitrile copolymer with 38% acrylonitrile
(d) No additive

*Example 3*

About 90 parts by weight of a polyvinyl chloride (K value 70) prepared by emulsion polymerization are processed with about 10 parts by weight of one of the substances hereinafter mentioned, as in Example 2 and then tested.

There is added to this polyvinyl chloride: (a) uretdione polyurethane 2 (as made in Example 1).

*Example 5*

About 60 parts by weight of a polyvinyl chloride (K value 70) prepared by emulsion polymerization are processed by 40 parts by weight of the substances listed below with addition of 0.6 part by weight of an organo-tin-stabilizer as in Example 2 and then tested.

There is added to this polyvinyl chloride:

(a) Uretdione polyurethane 5
(b) Uretdione polyurethane 6
(c) Uretdione polyurethane 7
(d) Uretdione polyurethane 8

(e) A polyester plasticizer prepared from adipic acid and 1,3-butane diol for comparison purposes

*Example 6*

About 50 parts by weight of a polyvinyl chloride (K value 70) prepared by emulsion polymerization are processed by 50 parts by weight of one of the substances listed below as in Example 2 and then tested. A comparison example with the polyester plasticizer as in Example 5(e) is not possible, since a polyester is in the given amount not computable with the polyvinyl chloride.

There is added to this polyvinyl chloride:

(a) Uretdione polyurethane 7
(b) Uretdione polyurethane 8

The uretdione polyurethane 5 to 8 are prepared under the same reaction conditions as given above in Example 1.

| Poly-urethane | Parts by weight of polyester | Parts of diisocyanate | | | | Parts of butane-1,4-diol | Parts of water |
|---|---|---|---|---|---|---|---|
| | | I | II | III | IV | | |
| 5 | 1,000 B$_1$ | 90 | 130 | | | 30 | |
| 6 | 1,000 B | 226 | 325 | | | 135 | |
| 7 | 1,000 C | 75 | | 174 | | | 14.5 |
| 8 | 1,000 C | 87 | | | 134 | 49 | |

B$_1$=polyester like B having an OH number of 63 and an acid number of 1.
C=hexane diol-1,6-penta glycol-adipic acid-polyester (hexane diol : penta glycol=2 : 6).
III=mixture of 2,4- and 2,6 toluylene diisocyanate (isomers 65 : 35).
IV=1,6-hexamethylene diisocyanate.

The following table indicates the results obtained with test plates prepared in accordance with Example 2 from the compositions of Examples 5(a) to (e) and 6(a) to (b):

| Example | Tensile Strength, kp./cm.$^2$ DIN 53504 | Breaking Elongation percent DIN 53504 | Tearing Strength, kp./cm. DIN 53515 | Increase and Decrease of weight in percent DIN 53405 | | | | | | | |
|---|---|---|---|---|---|---|---|---|---|---|---|
| | | | | Foil giving up plasticizer | | | | Foil absorbing plasticizer | | | |
| | | | | 1 day | 2 days | 5 days | 9 days | 1 day | 2 days | 5 days | 9 days |
| 5a | 196 | 227 | 60 | 0.1 | 0.2 | 0.1 | 0.1 | 0 | 0 | 0 | 0 |
| 5b | 398 | 258 | 53 | 0.0 | 0.1 | 0.1 | 0.2 | 0 | 0 | 0 | 0.1 |
| 5c | 379 | 263 | 57 | 0.1 | 0.1 | 0.1 | 0.2 | 0 | 0 | 0 | 0 |
| 5d | 245 | 326 | 62 | 0.0 | 0.1 | 0.1 | 0.1 | 0 | 0 | 0 | 0 |
| 5e | 184 | 386 | 36 | 0.3 | 0.4 | 0.4 | 0.5 | 0.1 | 0.1 | 0.3 | 0.5 |
| 6a | 368 | 325 | 56 | 0.0 | 0.1 | 0.1 | 0.2 | 0 | 0 | 0 | 0 |
| 6b | 216 | 327 | 51 | 0.0 | 0.0 | 0.1 | 0.1 | 0 | 0 | 0 | 0 |

The following examples illustrate the results obtained by blending a vinyl polymer-polyurethane composition containing uretdione groups with those obtained by blending a vinyl polymer-polyurethane composition free of uretdione groups. In addition, these examples further illustrate the results obtained by blending a preformed polyurethane with a vinyl polymer in comparison to a process which involves reacting polyurethane forming reactants in the presence of a vinyl polymer.

Example 7

About 1000 parts of an ethylene glycol-adipic acid polyester (OH number 56; acid number 1) are added to about 90 parts of toluylene, 2,4-diisocyanate at a temperature of between about 60 and 95° C. until dissolved and the resulting mixture is reacted with about 130 parts of 4,4'-diphenylmethane diisocyanate and about 5 parts of pyridine at a temperature of about 90° C. About 30 parts of butane-1,4-diol are added to the resulting mixture while maintaining the temperature at about 90° C. The resulting composition is a clear melt. About 6,275 parts of a polyvinyl chloride (K value 70) prepared by emulsion polymerization and containing about 1 percent of an organotin stabilizer based on the polyvinyl chloride are blended with the polyurethane and tested in accordance with the procedure described in Example 2.

Example 8

About 1000 parts of an ethylene glycol-adipic acid polyester (OH number 56; acid number 1) are added to about 90 parts of dimeric toluylene-2,4-diisocyanate at a temperature of between about 60 and 95° C. until dissolved and the resulting mixture is then reacted with about 130 parts of 4,4'-diphenylmethane diisocyanate at a temperature of about 90° C. About 30 parts of butane 1,4-diol are added to the resulting mixture while maintaining the temperature at about 90° C. The resulting composition is a clear melt. About 6,275 parts of a polyvinyl chloride (K value 70) prepared by emulsion polymerization and containing about 1 percent of an organo-tin stabilizer based on the polyvinyl chloride are processed with the polyurethane and tested in accordance with the procedure described in Example 2.

Example 9

About 1000 parts by weight of an ethylene glycol-adipic acid polyester (OH number 56; acid number 1), about 90 parts of toluylene-2,4-diisocyanate, about 130 parts of 4,4-diphenylmethane diisocyanate are added to about 6,275 parts of polyvinyl chloride (K value 70) prepared by emulsion polymerization and containing about 1 percent of an organo-tin stabilizer based on the polyvinyl chloride and about 30 parts of glycol and about 5 parts of pyridine and reacted with agitation at a temperature of about 90° C. The reaction product is then heated to a temperature of from about 150 to about 180° C. in order to prepare test plates in accordance with the procedure described in Example 2.

The polyvinyl chloride is transformed from a white to a brown color at the elevated temperature, thus making it essentially impossible to prepare satisfactory test plates.

Example 10

To about 6,275 parts of polyvinyl chloride (K value 70) prepared by emulsion polymerization and containing about 1 percent of an organo-tin stabilizer based on the polyvinyl chloride are added about 1000 parts of ethylene glycol-adipic acid polyester (OH number 56; acid number 1), about 90 parts of dimeric toluylene-2,4-diisocyanate, about 130 parts of 4,4'-diphenylmethane diisocyanate and 30 parts of butane-1,4-diol in accordance with the procedure described in Example 9 above. Again it is impossible to prepare satisfactory test plates from this composition due to the heterogeneity of the product thus formed.

The results of these examples are illustrated in the following table:

| Example | DIN 53504 Tensile Strength, kg./cm.$^2$ | Breaking Elongation, percent | DIN 53453 Impact Toughness, kg. cm./cm.$^2$ | Notch Impact Toughness | DIN 53456 Ball Pressure Hardness | |
|---|---|---|---|---|---|---|
| | | | | | 60'' | 10'' |
| 7 | 290 | 18 | 36 | 4.7 | 1,190 | 1,000 |
| 8 | 390 | 54 | not broken | 68.0 | 1,125 | 1,020 |

The above table illustrates the improvement in physical properties, such as, tensile strength, breaking elongation, impact toughness and notch impact toughness of a polyurethane-vinyl polymer composition containing uretdione groups in comparison to a polyurethane-vinyl polymer composition free of uretdione groups.

The compositions of this invention have utility in the same manner as unmodified vinyl polymers. They can be conveniently foamed into materials which have use as insulators or other uses to which known foamed materials have been put.

The articles are useful in all the places where plasticized vinyl polymers are employed and in which it is desired to avoid grow out of the plasticizers. Thus, for instance, the materials can be used as packaging foils, tubes and shoe soles as well as protecting layers for iron vessels.

Although the present invention was defined in detail in the foregoing discussion, it should be understood that this was done for illustrative purposes only. Those skilled in the art upon reading this basic disclosure will conceive of various modifications and variations of this basic invention. These are intended to be included within the scope of this invention.

What is claimed is:

1. A novel plastic composition obtained by blending a preformed vinyl polymer selected from the group consisting of polyvinyl chloride, polyvinyl acetate, polyvinylidene chloride, polystyrene and mixtures thereof with a preformed polyurethane composition containing from 2 to 75 weight percent of uretdione groups, said polyurethane obtained from the reaction of dimeric toluylene-2,4-dissocyanate with a composition containing active hydrogen atoms as determined by the Zerewitinoff test, wherein the vinyl polymer is blended with the polyurethane composition in a ratio of 100:1 to about 100:200 by weight.

2. The composition of claim 1 wherein a plasticizer is incorporated therein, said plasticizer being selected from the group consisting of phthalate, phosphate plasticizers, alkyl-sulphonic acid esters of phenol, alkyl sulfonic acid esters of cresol, polyesters containing free hydroxyl groups and mixtures thereof.

3. The composition of claim 1 wherein said active hydrogen containing compound and said dimeric toluylene 2,4-diisocyanate are reacted at a temperature of from about 60 to 95° C.

4. A process for preparing a novel plastic composition which comprises blending a preformed vinyl polymer selected from the group consisting of polyvinyl chloride, polyvinyl acetate, polyvinylidene chloride, polystyrene and mixtures thereof with a preformed polyurethane composition containing from 2 to 75 weight percent of uretdione groups, said polyurethane obtained from the reaction of dimeric toluylene-2,4-diisocyanate with a composition containing active hydrogen atoms as determined by the Zerewitinoff test, wherein the vinyl polymer is blended with the polyurethane composition in a ratio of 100:1 to about 100:200 by weight.

5. The process of claim 4 wherein said vinyl polymer is blended with the polyurethane composition at a temperature below the decomposition temperature of the uretdione groups.

6. The process of claim 4 wherein the polyurethane composition is obtained by reacting dimeric toluylene 2,4-diisocyanate with a composition containing active hydrogen atoms as determined by the Zerewitinoff test at a temperature below the decomposition temperature of the uretdione groups.

References Cited

FOREIGN PATENTS 583,363 9/1959 Canada.
805,167 12/1958 Great Britain.

MURRAY TILLMAN, *Primary Examiner.*

P. LIEBERMAN, *Assistant Examiner.*